June 23, 1970  G. BLAND  3,516,653
METHOD OF AND APPARATUS FOR ASSEMBLING STACKS OF
FLEXIBLE SHEETS IN A PREDETERMINED ORDER
Filed April 18, 1967  2 Sheets-Sheet 1

Inventor
GEOFFREY BLAND

By
Cushman, Darby & Cushman
Attorneys

Inventor
GEOFFREY BLAND
By Cushman, Darby & Cushman
Attorneys

United States Patent Office 3,516,653
Patented June 23, 1970

3,516,653
METHOD OF AND APPARATUS FOR ASSEMBLING STACKS OF FLEXIBLE SHEETS IN A PREDETERMINED ORDER
Geoffrey Bland, Newcastle, England, assignor to Formica International Limited, London, England, a British company
Filed Apr. 18, 1967, Ser. No. 631,753
Claims priority, application Great Britain, Apr. 26, 1966, 18,214/66
Int. Cl. B32b *31/00;* B65h *39/02*
U.S. Cl. 270—58                           2 Claims

ABSTRACT OF THE DISCLOSURE

A method and apparatus for facilitating the assembly of a stack of flexible sheets on a horizontal support surface in which sheets are removed in order from a plurality of stacks onto a sheet support member which carries the sheets to a position above a receiving support station for the final stack. The invention is particularly concerned with the manufacture of laminates of resin impregnated sheets of paper or the like.

---

This invention relates to a method of and apparatus for facilitating the manual assembly of sheets of material upon a horizontally disposed support surface. The invention is especially applicable to the laminating industry in which it is necessary to build up multilayer stacks of resin impregnated sheets of fibrous material such as paper before consolidating them under the action of heat and pressure to form the finished laminates.

In practice, each finished laminated board is made up of an assembly of sheets comprising a set of core sheets, a decorative print sheet and a melamine impregnated surface sheet and, for economic reasons, a large number of such boards are produced simultaneously between the platens of a multidaylight press. Furthermore, in order to ensure that the maximum possible use is made of the press it is desirable that the time taken to preassemble a press load be less than the pressing time for the consolidating operation. For example, if the daylight openings of a particular press are capable of accommodating a total of 240 boards and the pressing time is 80 minutes it follows that the average time to build up the multiple layers of paper, as referred to above, should not exceed 20 seconds for each board. It is customary to provide in each multilayer stack, between adjacent pairs of individual board assemblies, a press plate which serves to separate adjacent decorative surfaces and to impart a desired finish thereto; for example the press plate may be highly polished on both sides and in such cases the paper assemblies must be alternatively arranged so that the melamine impregnated surface sheets are always disposed towards a polished surface.

To avoid damage to the finished boards or polished press plates it is essential to prevent ingress of dust particles, etc., into the stack, therefore it is preferable to carry out the building up process under dust free conditions within a sealed room. Heretofore the operation has involved laying stacks of the various sheets upon racks and manually withdrawing sheets of the correct quantity and type and depositing them upon a laying-up table and interposing them with polished plates in the order referred to above.

It is the object of the invention to facilitate the handling of the paper sheets by reducing the number of manipulation sequences despite the considerable difficulty that is normally experienced in rapidly transposing large sheets of paper (which may be in the order of 60 square feet) without causing accidental damage, especially as some of the sheets are inherently brittle.

According to the invention there is provided a method of assembling a stack of thin flexible large-sized sheets comprising establishing a plurality of bulk storage stacks each comprising either a different type of sheet from that of the other storage stack or stacks or different type sheets in a prearranged order, manually transporting one or more sheets from each storage stack to a movable sheet support member in desired sequence, moving the sheet support member towards a sheet receiving station so that the sheets are positioned above the sheet receiving station, and holding the leading edges of all the sheets on the sheet support member while withdrawing the sheet support member so that the sheets are deposited from the sheet support member onto the sheet receiving station.

In a preferred arrangement the sheet materials are resin-impregnated paper and, for example, there are two bulk storage stacks one including alternating pairs of laminate print sheets and laminate overlay sheets and the other laminate core sheets. It is preferred that two pairs of laminate print sheets and laminate overlay sheets are passed from said other stack to the sheet support member, a group of core sheets passed from the one stack onto the sheets already supported by the sheet support member, half this group of core sheets is passed from the sheet support member to the sheet receiving station, and then the sheet support member is moved to a position above the sheet receiving station and the sheets supported thereon deposited upon the core sheets already positioned at the sheet receiving station.

According to a further aspect of the invention there is provided apparatus for stacking relatively large flexible sheets, comprising a plurality of horizontally disposed supports for receiving storage stacks of sheets, a horizontally disposed sheet receiving station support, and a sheet support member movable between the stacks and a position over the sheet receiving station for temporarily supporting sheets moved from the storage stacks and conveying them to the receiving station.

Preferably, the intermediary sheet support member is cantilevered from a slidable mounting bracket in such a manner that its supporting surface is capable of passing above the delivery stage. The mounting bracket may conveniently be carried on parallel horizontal guide rails situated below the level of the delivery stage, and is power actuated by means of a chain and geared electric motor.

Preferably, elevating means are provided for one of the said storage stacks so that the topmost sheet of the stack can be maintained at substantially the same height as the surface of the intermediary sheet support member.

Preferably, the surface of the intermediary support member is telescopically adjustable in a direction at right-angles to the said guide rails to accommodate paper sheets of different lengths.

The invention will now be described, merely by way of example, with reference to the accompanying drawings, in which.

Figure 1:
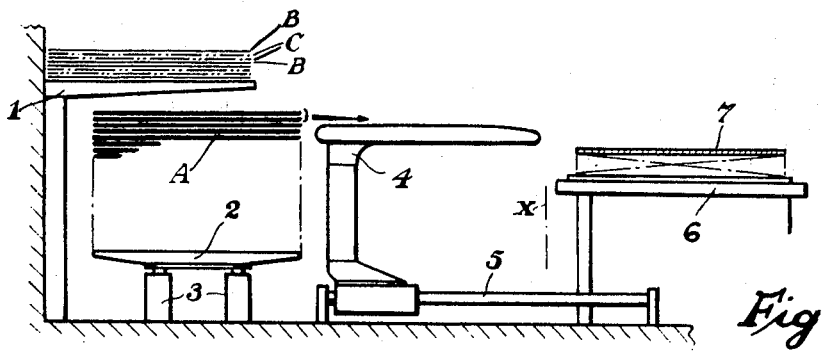
FIG. 1 is a diagrammatic end view of apparatus embodying the invention illustrating one position in the operating sequence thereof.

For the purpose of example the invention will be described in relation to the manufacture of laminated boards which each comprise the following components:

Ten resin impregnated core sheets (shown in the drawings as a continuous thick line A);

One impregnated print sheet (shown in the drawings as a continuous thin-line B); and One surface sheet of alpha cellulose impregnated with melamine resin (shown in the drawings as a chain dotted line C).

A rigidly mounted platform 1 is provided to support a first storage stack comprising adjacent pairs of B and C sheets, so arranged that the print sheets B are situated back-to-back, i.e., the printed surfaces always abut surface sheets C.

A second storage stack capable of supporting sets of sheets A is situated below the support 1 and comprises a horizontal platform 2 connected to an elevator, which for the purpose of example, is represented by hydraulic power cylinders 3; alternatively any well-known pile elevating system together with associated height sensing mechanism may be employed. Nonimpregnated separator sheets (not shown) are interposed between alternate sets of sheets A for the purpose of ensuring that the non-decorative surfaces of abutting boards do not adhere during the pressing operation.

A movable intermediary support member will be described in detail later, but briefly, it comprises a cantilever frame 4 carried on a pair of parallel tubular guide rails 5 so that it is capable of reciprocating between a retracted position and an advanced position X (FIG. 1).

The sheet delivery stage comprises a building-up table 6 situated at a lower level than the cantilever frame 4 to enable the latter to clear and pass above the maximum height of the pile being built up. FIG. 1 shows a partially completed stack on the table 6 on to which a polished plate 7 has been deposited.

Figure 2:
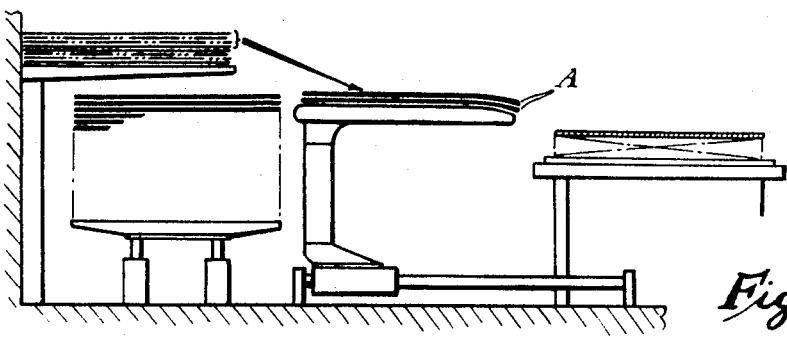
FIGS. 2, 3 and 4 are views similar to FIG. 1, but showing further positions in the operating sequence of the apparatus.

The cycle of operation commences by operators sliding a pair of sets of sheets A, with separator therebetween, from the second storage stack platform 2 onto the top of the surface of the frame 4 as is shown in FIG. 2.

Figure 3:
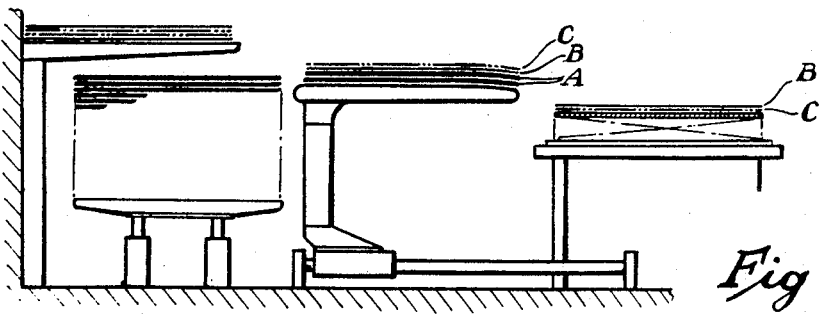

The second operation is indicated in FIG. 2. This comprises taking the top four sheets B–C–C–B from the first storage stack platform 1 and depositing same on top of the previously positioned sets A on the frame 4 as per the first operation. Thereafter the top two of these sheets (B–C) are immediately carried over onto the polished plate on the building-up table 6 as is shown in FIG. 3. Considering this second operation from a more practical aspect, the four sheets are slid from the storage for conveyance to the building-up table and the lower two are released onto the frame 4 en route.

Figure 4:
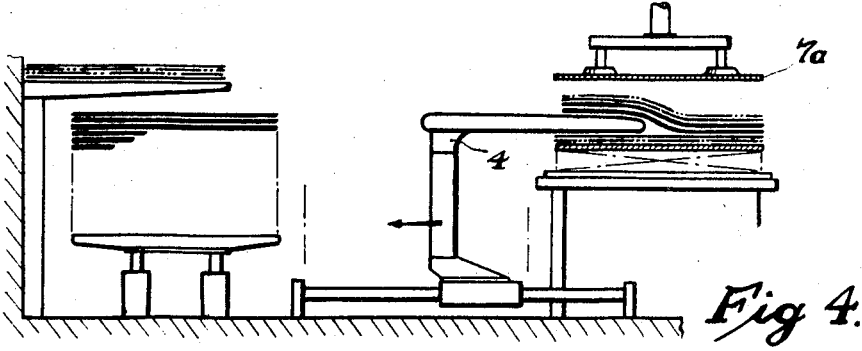

In the final operation the frame 4 is propelled along the guide rails 5 to its full extent of travel and the operators seize the front edges of all the sheets so that they fall down on top of the sheets B and C already positioned on the building-up table 6. In FIG. 4 the frame 4 will be seen returning to its initial position and the sheet components of two back-to-back boards are positioned in readiness for the lowering down of the following polished plate 7a. The cycle is thereafter repeated.

Figure 5:
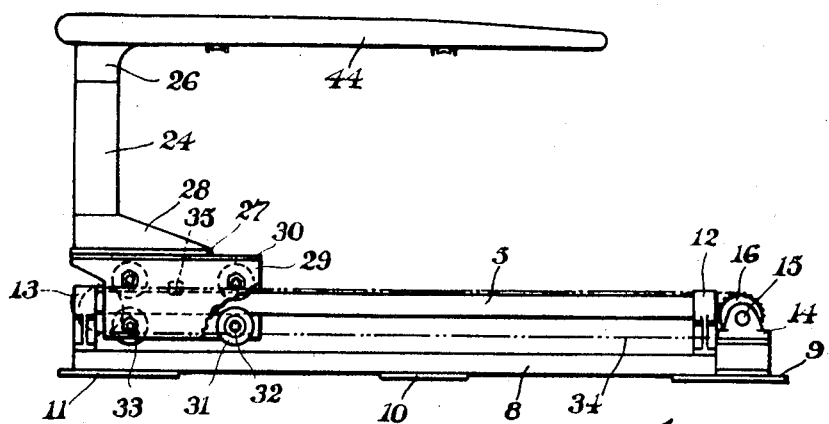
FIGS. 5 and 6 show, to a larger scale, end and fragmental plan views of the movable support member comprising part of the apparatus of FIG. 1.

The construction of the movable support member 4 will now be described with reference to FIGS. 5 and 6.

A fixed framework for the support member comprises a pair of parallel inverted channel members, one of which is shown at 8. Three mounting plates 9, 10 and 11 are welded to the underside of each channel and fabricated brackets 12 and 13 are detachably mounted to the top of each end of each channel. Each pair of brackets is drilled to receive the opposite ends of a tube 5 which forms one guide rail for the movable assembly. Bearing blocks 14 are attached to each of the plates 9 to form bearings for shafts 15 on to which chain sprocket wheels 16 are mounted. The channel members are bridged at one end by two pairs of transverse angles 17 and 18. Angles 17 provide the mounting means for three spaced journal blocks two of which are shown at 19 and 20 which form the bearings for a shaft 21. Angles 18 form a mounting for a reversible geared electric motor 22. The motor is arranged to drive the shaft 21 by means of gearing and the opposite ends of the shaft are fitted with rigidly attached sprocket wheels 23 in alignment with the sprocket wheels 16.

The movable assembly consists of two substantially similar, fabricated frame members each of which comprises a vertical square-section steel tube 24 jointed to a pair of cantilever rectangular tubes 25 by means of brackets 26, The lower end of the tube 24 terminates at a horizontal base plate 27 braced by two further brackets 28. Each frame is attached to a movable carriage which comprises an inverted U-section frame having side plates 29 and an upper horizontal surface 30 which forms the attachment face for the base plate 27. The two assemblies are held together by bolting means (not shown). The roller assembly, by which each carriage runs along the tubular guide rail 5, comprises four grooved rollers 31 situated within the U-section frame and adapted to coact above and below the guide rail. Through the medium of antifriction ball races the rollers are mounted on four nonrevolving shafts 32 the ends of which are threaded to receive securing nuts 33 to retain them securely within holes formed in the side plates 29. The lower sets of holes are elongated to extend into the extreme edge of the side plates to permit vertical adjustment and also to facilitate assembly. In practice the lower rollers are adjusted so that the grooved portions of the rollers contact the cylindrical surface of the guide rails 5 and thus support the assembly and restrain overthrowing force caused by the protruding cantilever frame members 25. The carriage is propelled along the guide rails by means of a chain 34 attached to the side plates 29 by means of chain anchors 35, and carried around the driven sprocket wheels 23 and the idler sprocket wheels 16.

Figure 6:
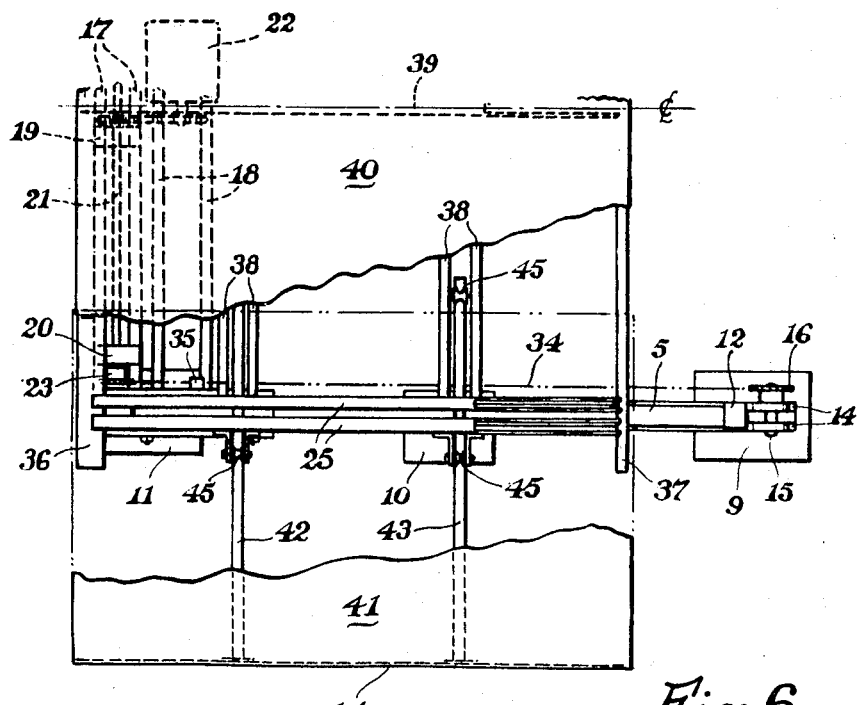

The two frame members are jointed together at their extremities by large and small longitudinal tubes 36 and 37 as shown in the plan view in FIG. 6 and additionally four parallel intermediate bracing members 38 are included to provide central rigidity. An intermediate transverse rib 39 parallel to the frame members is provided to stiffen the tubes 36 and 37 and also to connect with the members 38.

The top surface of the assembly comprises a thin-gauge sheet metal plate 40 extending above the frame members and attached thereto, and wrapped partially around the tubes 36 and 37.

The longitudinal length of the top surface may be readily extended on each side by means of left and right hand telescopically arranged metal plates (the right hand being shown by symbol 41). Each plate is supported structurally by means of slidable tubes 42 and 43 anchored at one end to an end panel 44 welded to the extension plate 41, and capable of passing within holes drilled in the rectangular tubes 25 of the frame members. Free-running grooved rollers 45 are mounted on bolts between the longitudinal members 38 in such a manner that two rollers are disposed below and two above each of the slidable tubes 42 and 43. The tubes and the extension plates are thereby supported and the rollers permit the assembly to be telescoped over the main central surface 40 thereby to reduce the superficial plan area of the apparatus as required.

Limit switches and associated stops (not shown) are provided to control an electrical circuit to operate the driving motor in a forward or backward direction to enable the above described movable intermediary sheet support members to carry out the functions as illustrated in FIGS. 1–4.

I claim:

1. In a method of assembling at a sheet receiving station a stack of flexible laminate print sheets, laminate overlay sheets and laminate-core sheets wherein the stack is built up of the sheets in a predetermined order from separate stacks of the individual sheets, the improvement which comprises:

establishing two bulk storage stacks, one including laminate-core sheets and the other including alternating pairs of laminate print sheets and laminate overlay sheets, manually transporting a group of laminate-core sheets from said one stack to a movable sheet support, manually transporting four adjacent sheets comprising a pair of laminate overlay sheets disposed between two laminate print sheets from said other stack to a position on said laminate core sheets already supported by said movable sheet support, passing the upper two of said four sheets from the sheet support member to the sheet receiving station, moving the sheet support member to a position above said sheet receiving station, holding the leading edges of all the sheets on the sheet support member, and at the same time withdrawing said sheet support member to deposit the remaining sheets from said support member onto the two sheets already deposited at said sheet receiving station.

2. The method of claim 1, including the steps positioning polished metal sheets at said sheet receiving station whereby a stack is formed with groups of sheets of resin impregnated paper separated by polished sheets between laminate overlay sheets in said stack.

References Cited

UNITED STATES PATENTS

| | | | |
|---|---|---|---|
| 2,565,251 | 8/1951 | Malmstrom | 161—56 |
| 3,017,041 | 1/1962 | Hawkes et al. | 214—6 |
| 3,281,146 | 10/1966 | Bridge | 271—68 |

EUGENE R. CAPOZIO, Primary Examiner

P. V. WILLIAMS, Assistant Examiner

U.S. Cl. X.R.

156—563; 214—6; 271—84